(12) United States Patent
Jensen (10) Patent No.: US 7,629,280 B2
(45) Date of Patent: Dec. 8, 2009

(54) MINERAL FIBRE PRODUCTS

(75) Inventor: Soren Lund Jensen, Holte (DK)

(73) Assignee: Rockwool International A/S (DK)

( * ) Notice: Subject to any disclaimer, the term of this patent is extended or adjusted under 35 U.S.C. 154(b) by 609 days.

(21) Appl. No.: 10/560,061

(22) PCT Filed: Jun. 11, 2004

(86) PCT No.: PCT/EP2004/006345
§ 371 (c)(1), (2), (4) Date: Oct. 27, 2006

(87) PCT Pub. No.: WO2004/110945
PCT Pub. Date: Dec. 23, 2004

(65) Prior Publication Data
US 2007/0166538 A1      Jul. 19, 2007

(30) Foreign Application Priority Data

| Jun. 13, 2003 | (GB) | ................................ 0313763.5 |
| Jul. 31, 2003 | (GB) | ................................ 0317989.2 |
| Aug. 20, 2003 | (EP) | ................................ 03255160 |

(51) Int. Cl.
*C03C 13/06* (2006.01)
(52) U.S. Cl. .......................... 501/36; 501/35; 501/95.1; 51/298; 428/370; 428/364; 65/455
(58) Field of Classification Search ............. 501/35, 501/36, 95.1; 428/370, 364.373; 51/298; 65/455
See application file for complete search history.

(56) References Cited

U.S. PATENT DOCUMENTS

2003/0015003 A1    1/2003    Fisler et al.

FOREIGN PATENT DOCUMENTS

| GB | 1 281 381 A | 7/1972 |
| WO | WO 2006063846 A1 * | 6/2006 |

OTHER PUBLICATIONS

Derwent Abstract 2002-380508, Derwent Abstract of U.S. 6,319,866, Nov. 20, 2001.*
Dorothee J.M. Burkhard, Journal of Petrology, vol. 42, pp. 507-527 (2001).

* cited by examiner

*Primary Examiner*—Karl E Group
*Assistant Examiner*—Elizabeth A Bolden
(74) *Attorney, Agent, or Firm*—Dickstein, Shapiro, LLP.

(57) ABSTRACT

The properties of mineral fibres comprising silicon, magnesium, calcium, iron, aluminium and oxygen atoms are improved by exposure to a heat treatment under oxidising conditions which causes migration of MgO, thereby creating an outer layer with increased concentrations of MgO. Batts and other fibrous products containing the fibres have increased resistance to shrinkage and sintering.

20 Claims, 6 Drawing Sheets

MINERAL FIBRE PRODUCTS

BACKGROUND OF THE INVENTION

This invention relates to mineral fibre products, and methods of making them, which are of particular value for use as heat insulation and fire protection at high temperatures, for instance above 700° C. and often above 900° C. or above 1000° C. In particular, it relates to such products formed from mineral fibres which are based on a silicate network which comprises silicon, calcium, magnesium, iron, aluminium and oxygen atoms and optionally small amounts of alkali metal and other minor components.

Typically the fibres to which the invention relates always include at least 3% FeO and at least 5% MgO and never more than 8% alkali metal oxide. The amount of CaO is usually at least 8% and the amount of $SiO_2$ is usually 35 to 55%, and the amount of $Al_2O_3$ is usually up to 25%. Any other elements are usually present in only very small amounts, for instance below 5%, and usually below 2%, of the oxides.

In this specification all analytical amounts are expressed as percentages by weight (unless otherwise specified) of oxide based on all the elements expressed as oxides. The iron is always expressed herein as FeO even though, in practice, some or most of it may be present as ferric.

These fibres are therefore the fibres of the types known generally by terms such as rock wool, slag wool or stone wool. They are different, as regards their analysis and their properties and their manufacture, from those generally known as glass fibres and which have a high alkali metal oxide content (typically above 15 or 20%) and which may also contain a significant boron content, typically above 5% $B_2O_3$, and which are always substantially free of iron. It is essential in drawn (and optionally flame attenuated) glass fibres to minimise iron because the presence of iron in amounts greater than trace quantities, for instance 1%, significantly alters the colour of the fibres and this can significantly influence the methods of heating and extruding the melt as filaments.

It is known that the properties of all silicate fibres, including the fibres to which the invention relates, depend in part on the chemical analysis of the fibres and thus on the nature of the total silicate network including atoms retained with in the network. It is also known that when the temperature of an assembly of the fibres exceeds Tg (the glass transition temperature) the fibres adopt a visco-elastic state with the result that they may tend to start to lose their individual fibrous form, and in particular there may be some flow at the surfaces of the fibres, leading to fusion at the intersections of fibres. At higher temperatures, the flow becomes more serious and the fibres may fuse into a much smaller volume than was occupied by the original assembly of fibres. At Tc (the crystallisation temperature) the tetrahedral network will tend to reorganise into a crystalline structure. As the temperatures increase still further, the crystals will start to melt at Tm, the melting temperature. For a typical rock fibre Tg may be around 650-700° C. eg 680° C., Tc around 820-900° C. eg 850° C. and Tm around 1,000 to 1,100° C. eg 1050° C.

It is also known that the conditions under which the fibre product is exposed to increasing temperature may significantly influence the performance of the fibres. In particular it is known that when a thick slab of bonded, high density, mineral wool is exposed to high temperatures, the core may shrink due to sintering to leave a void (with the result that the fire protection properties are unsatisfactory) whilst the outer surface may remain reasonably fibrous.

A particular problem arises with fire doors and sandwich panels, namely semi-sealed or sealed products containing bonded mineral wool between sheets of material which prevent free access of air. It is found that these may fail due to sintering at a temperature lower than would be expected having regard to the known failure temperatures of the mineral wool.

These failures of bonded mineral wool and of sealed or semi-sealed products have generally been assumed to be caused by the exotherm created by the combustion of organic bonding agent in the mineral fibre product, this exotherm giving local heating so as to cause localised increase in temperature, and therefore sintering.

The mechanisms by which the fibrous assembly eventually shrinks, for instance to form a void, as the temperature increases can therefore be seen to be rather complex but, whatever the mechanism, the effect is generally referred to as sintering.

It is essential that a fire door or other heat insulation or fire protection assembly should reliably retain its performance properties. It is therefore essential that shrinkage or sintering does not occur since, if there is shrinkage or sintering, there will be failure in the insulation and fire protection properties in those regions where shrinkage and sintering has occurred. It is therefore conventional to report the temperature at which any particular type of fibre is likely to fail. For instance shrinkage or sintering temperatures are commonly quoted as an indication of the temperature at which the fibrous nature of the fibres is likely to be lost under defined conditions. Numerous publications therefore quote collapse or sintering temperatures.

This invention relates particularly to enhancing the fibres so as to give improved resistance to shrinkage or sintering, for instance so as to increase the temperature at which shrinkage or sintering may occur.

At present, the prior art proposes two main ways of achieving this.

One way of improving resistance to shrinkage or sintering has been to add various endothermic compounds into mineral fibre products which are intended for fire protection, so that the added compound will tend to absorb heat energy and thus delay the onset of shrinkage or sintering, despite the external temperature being higher than the fibre might have been able to with stand in the absence of the added material. A typical example is EP-A-0936060. Instead of using strictly endothermic materials, it is also known to use reactive materials, for instance as in GB-A-1,281,381.

Another way is to select appropriately the chemical analysis of the melt from which the fibres are formed, for instance by forming them from a melt having high amounts of iron and/or magnesium and/or aluminium in the melt and therefore in the silicate network. The ultimate would be to make ceramic fibres, for instance using melts containing high amounts of alumina, typically above 30%. An example of such fibres which are, or are almost, ceramic is given in U.S. Pat. No. 5,312,806. Unfortunately forming fibres which are ceramic or near ceramic as a result of high alumina contents, and the subsequent handling of the fibres, is difficult and expensive.

The selection of the chemical content of mineral fibres now has to take account of numerous factors including ability to form the fibres by conventional techniques, cost and availability of raw materials, biodegradability of the fibres, and weather resistance of the fibres and, as discussed above, the sintering properties of the fibres. Accordingly it is undesirable to be restricted by the additional requirement of improving resistance to shrinkage and sintering.

The problem to be solved by the invention therefore is to find a way of improving the resistance to shrinkage and/or sintering of fibrous products made from a wide range of convenient rock, stone and slag melts, so as to reduce or eliminate the need for total reformulation of the melt (for instance high aluminium) and with out the compulsion to add endothermic compounds to the fibrous product.

SUMMARY OF THE INVENTION

As explained below, this invention is solved as a result of post-treating the fibres so as to provide them with a unique combination of analysis and surface structure which is obtainable as a result of the conventional content, especially of iron and magnesium, of the rock, stone or slag melt and the fibres made from it.

It is known from US-A-2003/0015003 that the surface content of certain fibres can be altered by subjecting the fibres to, for instance, flame attenuation, or other treatments. The fibres are formed from glass melts, namely melts having a high alkali metal oxide content (typically above 20%), low combined calcium and magnesium oxides (with the magnesium oxide often being zero) and preferably zero iron oxide. These treatments are designed to improve moisture resistance and so are irrelevant to the problem of improving resistance to sintering and collapse of rock, stone and slag fibres, i.e., fibres containing significant amounts of iron and magnesium and calcium.

Mineral fibre products according to the invention comprise fibres formed of a silicate network and comprise silicon, calcium, magnesium, iron, aluminium, oxygen and optionally alkali metal, as is conventional for rock, stone and slag fibres. Accordingly the amount of iron is usually at least 3% FeO, the amount of alkali must be relatively low, usually not more than 8% alkali metal oxides and the amount of magnesium must be relatively high, usually at least 5% MgO. Accordingly, these melts are entirely different from the high alkali, zero iron, low alkaline earth melts of US 2003/0015003. In the invention, at least 70% of the iron is present as ferric iron, and the fibres have a core which is surrounded by an outer surface layer less than 1 µm thick in which the peak concentration of magnesium atoms is at least 1.5 times the concentration of magnesium atoms in the total fibres.

In the present invention, the surface layer can be formed in any appropriate manner. The surface layer normally merges with the core and may be formed by diffusion with in the fibre, and it appears that the preferred layer is formed by outwards diffusion of magnesium cations, and usually also calcium cations, towards the surface of the fibres. The invention includes the treatment of mineral fibres having the described analysis but wherein the fibres contain at least 2% ferrous iron as FeO (and a total iron content of at least 3%), and these fibres containing at least 2% ferrous iron are exposed under oxidising conditions to a controlled increased temperature which is above the temperature at which oxidation of the ferrous iron in the fibres occurs but which is below the temperature at which substantial network crystallisation occurs. As a result, at least 70% of the total amount of iron is oxidised to ferric. Also, there is migration of magnesium from with in the fibres to form the surface layer having the defined peak concentration. There is usually also migration of calcium as a result of which the fibres will have peak concentrations in the surface layer of magnesium and calcium which are greater than the concentrations of magnesium and calcium in the remainder of the fibres.

We find that the result of treating the fibres so that the iron is wholly or substantially ferric and so that there is an outer surface layer which is enriched in magnesium and usually calcium is that the fibres are able to with stand higher temperatures before sintering or shrinkage occurs.

Although it is naturally desirable that all the fibres in the fibre product should be modified in this way, it is not essential provided that the proportion of fibres which is modified in this way is sufficiently high to impart improved temperature resistance to the entire product. The fibres having the surface layer are preferably distributed substantially uniformly (in all three dimensions) through the batt or other product in order that the batt has substantially uniform temperature resistance throughout its volume.

In practice it is usually simplest to subject all the fibres which it is intended to modify to the conditions that will provide the modification, with out checking that each and every fibre is modified.

BRIEF DESCRIPTION OF THE DRAWINGS

The invention is illustrated in the accompanying drawings in which.

DESCRIPTION OF THE INVENTION

The enriched outer layer of the fibre may comprise magnesium, and usually also calcium, predominantly in the form of simple or complex oxides. The enrichment may comprise small crystals which may be so small they can be termed nano-crystals. It may be more accurate to refer to them as nucleation sites. The crystals or sites are believed to be of calcium and/or magnesium oxides and/or calcium magnesium silicates (optionally also including other atoms such as iron and aluminium), and in particular comprises small crystals or sites of diopside and/or augite and/or spinal.

Preferably the peak concentration of each of calcium and magnesium in the outer layer is at least 1.5, 2, 3 or 4 times, and may be as much as 5 times or even up to 6 or 7 times or more, the concentration in the total fibre. In particular, although good results are obtained with calcium concentrations which are, for instance, 1.2, 2 to 4 times the concentration in the remainder of the fibre, it seems desirable for the magnesium enrichment to be particularly high, for instance being 3 to 6 times the magnesium concentration in the total fibre.

Figure 1:
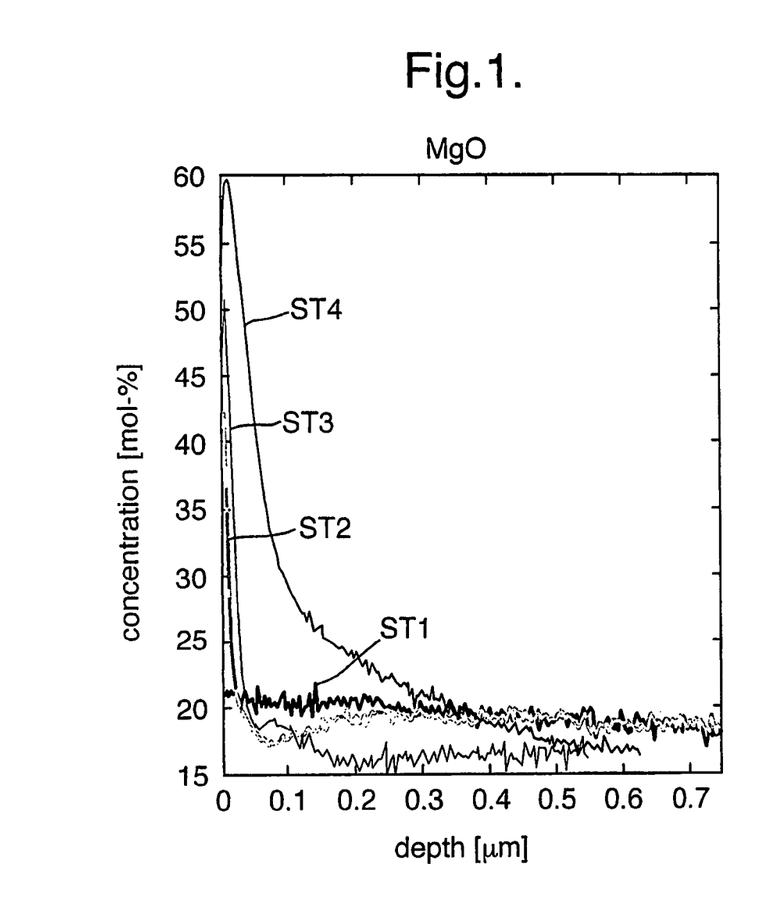
FIGS. 1-7 are SNMS plots showing the concentrations of various elements in the surface of fibres, as discussed in Example 2.
Figure 2:
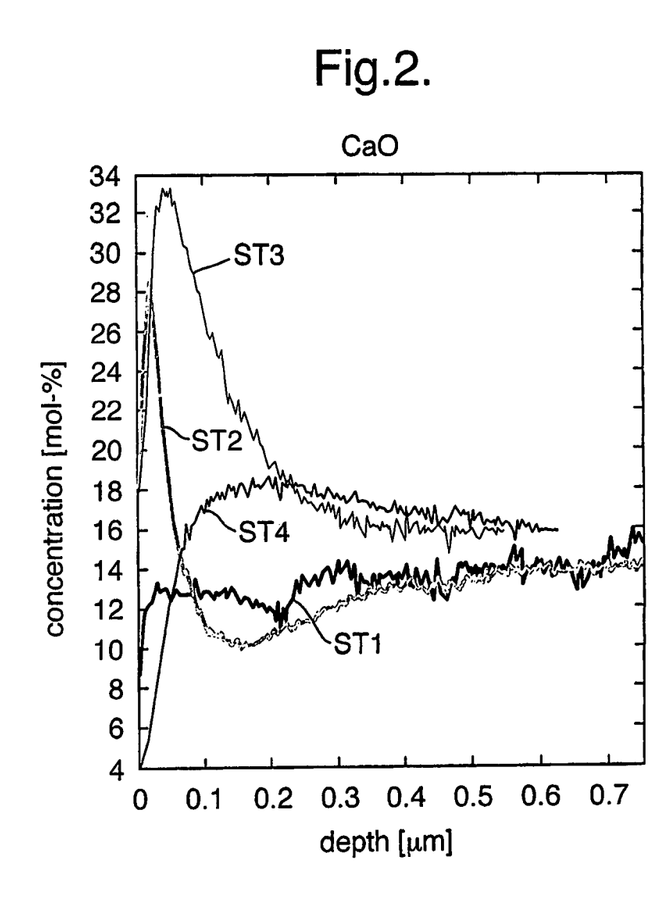
Figure 3:
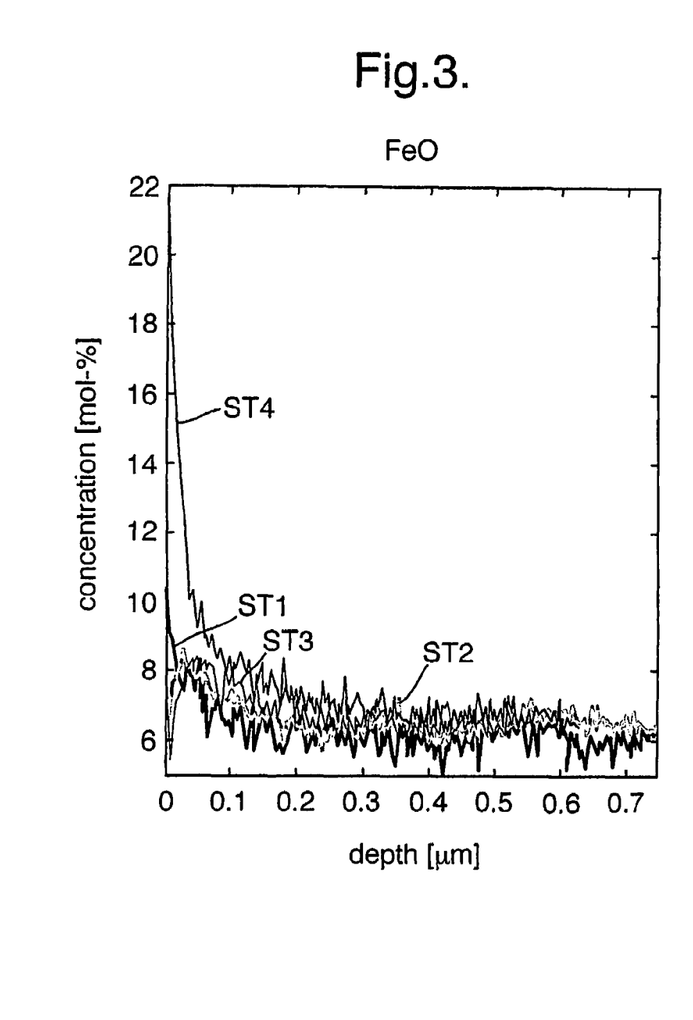
Figure 4:
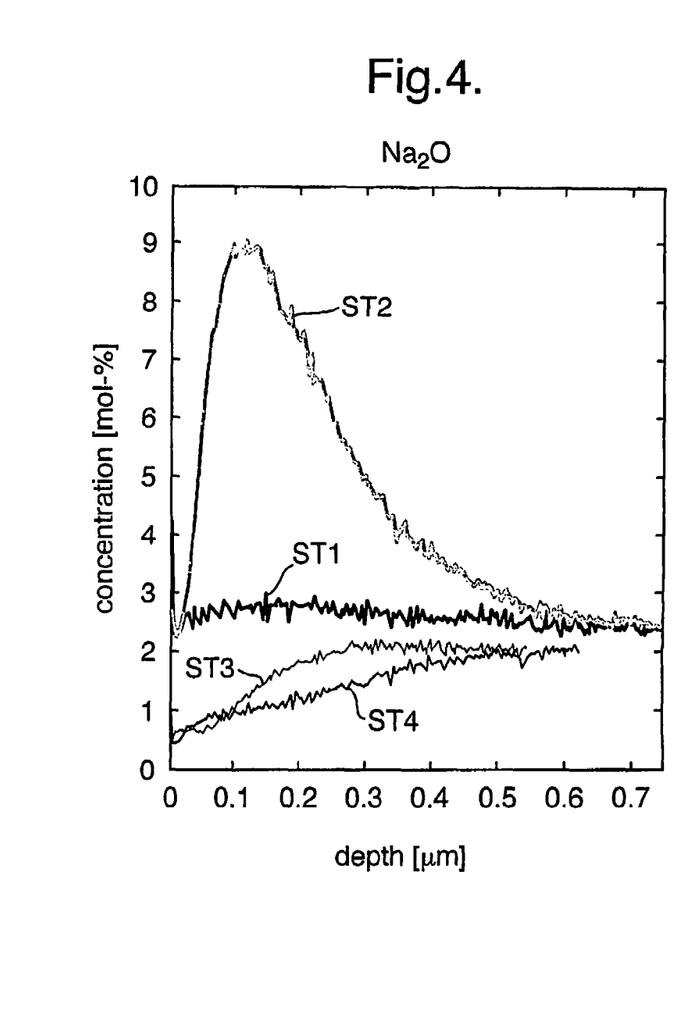
Figure 5:
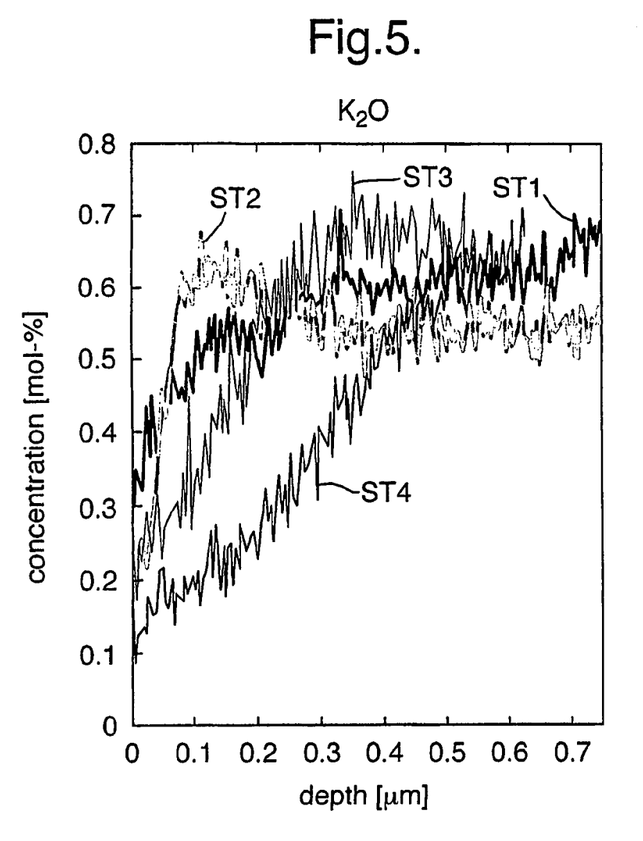
Figure 6:
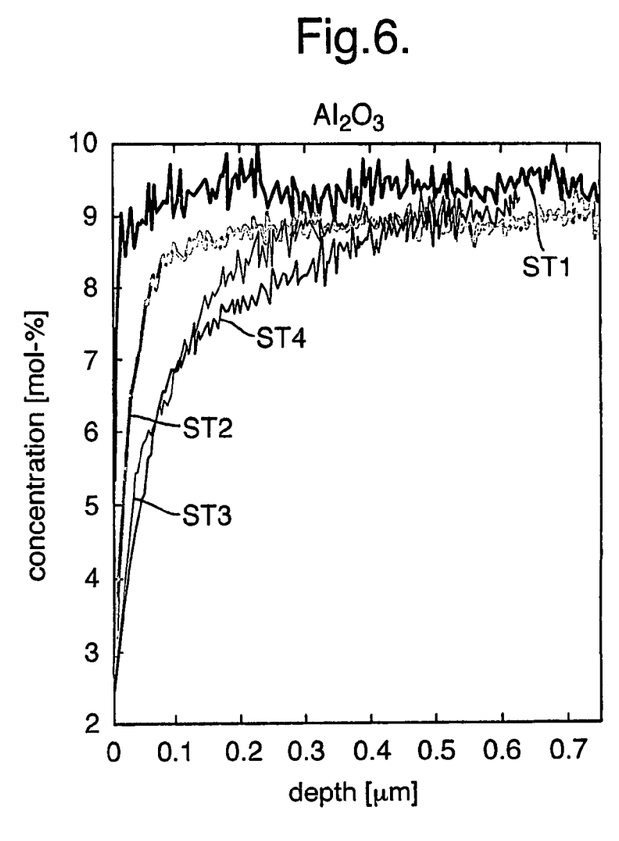
Figure 7:
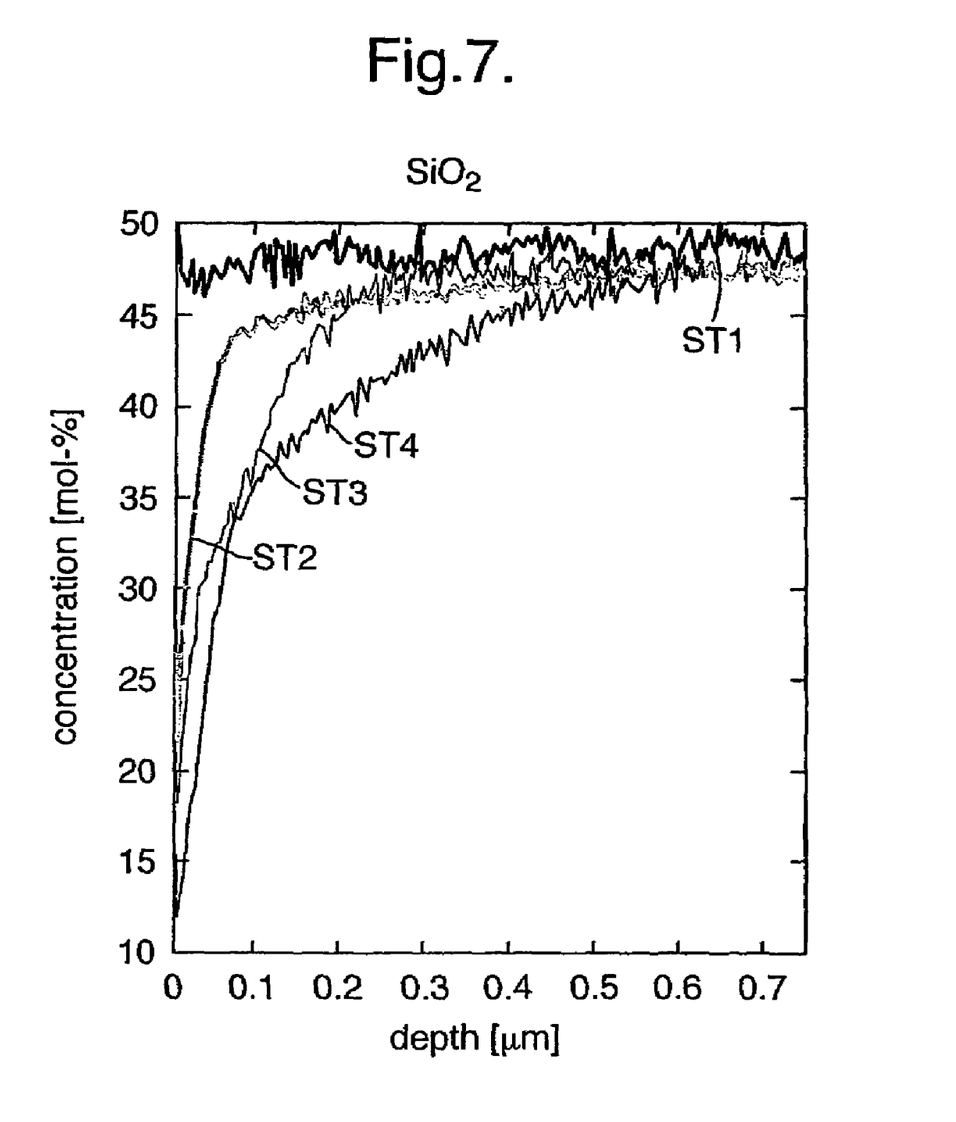
Figure 8A:
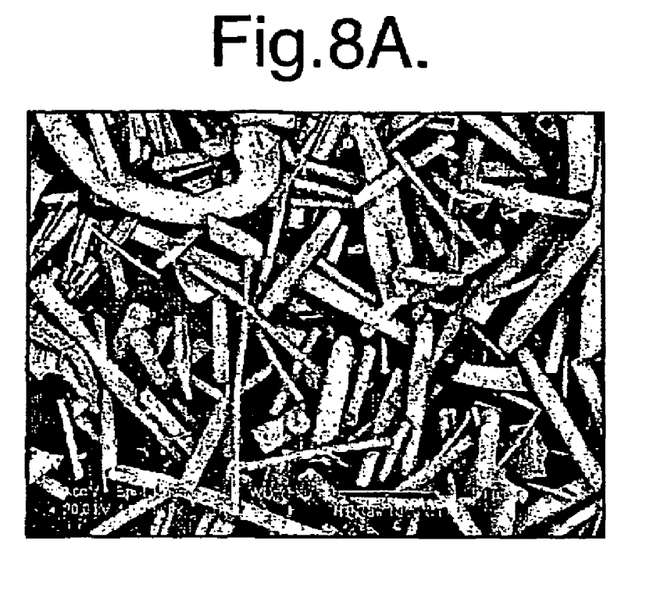
FIGS. 8A-8E are Scanning Electron Micrographs of various products after exposure to various conditions, as discussed in Example 3.
Figure 8B:
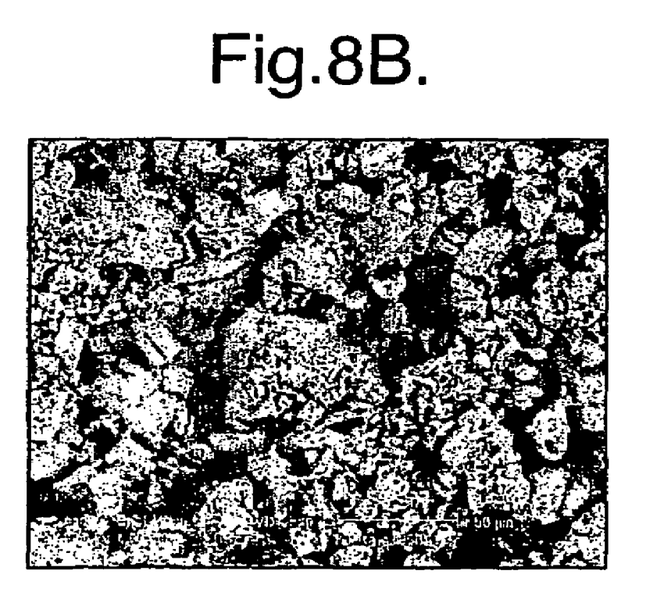
Figure 8C:
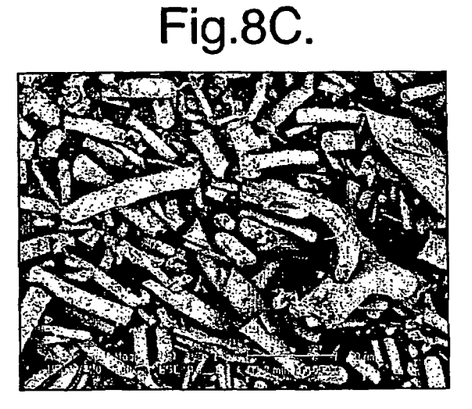
Figure 8D:
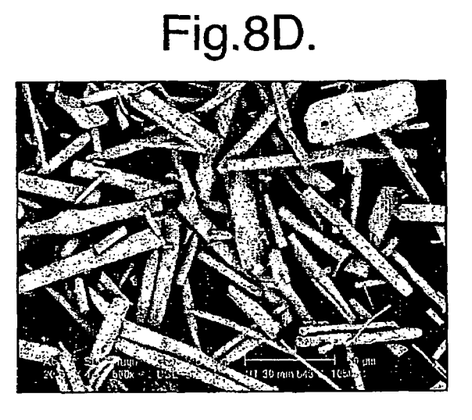
Figure 8E:
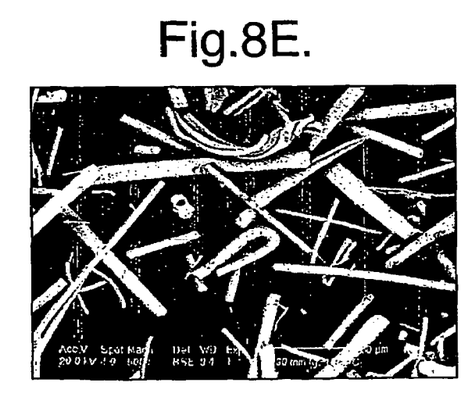

By saying that the peak concentration of magnesium atom in the layer is at least 1.5 times the concentration in the total fibre we mean that, when the fibre is subjected to SNMS (Scanning Neutron Mass Spectrometry) depth profile analysis and the concentration of magnesium atoms is plotted from the outermost surface inwards (as shown in FIG. 1), the peak concentrations of magnesium atoms which are observed in the outer layer are at least 1.5 times the substantially uniform normal concentration of magnesium atoms that will be observed throughout the remainder of the fibre. This substantially uniform concentration is substantially the chemical analysis of the total fibre. Similarly, all other references to concentrations of other elements in the surface layer relate to the concentrations shown by SNMS, as in FIGS. 1 to 7.

The surface layer can be regarded as the layer over which the magnesium atom concentration (and usually also the calcium atom concentration) is measurably higher than the concentration in the total fibre and this surface layer is below 1

μm thick and is usually below 0.5 μm thick. Often the surface layer is 0.1 or 0.2 to 0.5 μm thick. The peak concentrations discussed above are usually in the outermost 0.01, and often 0.05, μm of the fibre. Accordingly the core (ie excluding the 0.5 or 1 μm surface layer) will normally have a substantially uniform concentration of most or all of the elements in the fibre, and the highest concentrations of calcium and magnesium atoms are in the outermost 0.05 μm or 0.1 μm, with transitional concentrations in the intermediate region between the peak concentration and the core inwards of 0.05 or 0.1 μm.

It seems that the presence of the enriched magnesium (and usually also calcium) layer in the surface prevents or reduces the initiation of melt flow at the surfaces and intersections of fibres, which is probably the first step towards sintering and shrinkage. Thus, the provision of the enriched layer results in an increase in the temperature at which surface melt flow starts to occur and results in an increase in the temperature at which shrinkage and sintering will occur.

There is some evidence that iron atoms also may be present in the outer surface layer in an amount greater than the amount in the remainder of the fibre, for instance in an amount of 1.1 or 1.2 up to 2 or more times the amount of iron in the remainder of the fibre. This occurs especially when the amount of calcium is less than 2 times the calcium concentration in the remainder of the fibre, for instance when there is little or no calcium enrichment of the surface layer.

However the predominant characteristic of the iron in the fibre is that it must be substantially ferric and thus at least 70% of the iron in the fibre must be ferric and usually at least 80, 90 or, preferably, at least 95% of the iron is ferric. It seems that ideally substantially 100% of the iron would be ferric. These percentages are based on the weight of iron.

The fibres which are treated in the invention, and thus the fibres in the novel products of the invention, are preferably based on stone, rock or slag wool fibres. Expressed by weight of oxides, such fibres preferably contain at least 2%, and generally at least 3%, 4% or 5% or more ferrous and may contain as much as 10, 12 or even 15% ferrous (all expressed as FeO). The total iron content of the starting fibres is usually at least 3%, most usually 5 to 10% but can be up to 12 or 15% (all expressed as FeO). Initially some of the iron may be ferric, but the iron is mainly (at least 50% and often at least 70%) ferrous when the fibres are made under a reducing environment, such as in a cupola furnace.

As regards the other elements, expressed by weight of oxides, the amount of silicon is usually 35 to 55%, often 38 to 50% (i.e., weight percent $SiO_2$ based on total oxides). The amount of calcium is usually at least 8%, often 10 to 20% or more, e.g., up to 30 or 35% (by weight CaO). The amount of magnesium is usually at least 5%, often 8 to 15% or more, for instance up to 20 or 25% (by weight MgO). The fibres may be free of alkali but generally contain alkali (by weight $Na_2O+K_2O$) in amounts of from zero to 8%, usually 1 to 4% or 5%.

The amount of aluminium (as $Al_2O_3$) is usually 1 to 25%. If it is required that the fibres should be soluble at around pH 7.5 the amount of aluminium is usually from 1 to 10%, usually 1 to 5% (by weight $Al_2O_3$) but otherwise the amount of aluminium is usually 10 to 25 or 30%. Amounts of aluminium of at least 13%, and preferably at least 16% are especially preferred when it is required that the fibres should be soluble at pH 4.5 and typical amounts are 16 to 22%.

When the fibres are required to have ceramic properties and to have particularly high heat resistance, the fibres may have a high content of $Al_2O_3$, of above 25 or 30%, e.g., up to 35%, 40%, or higher.

The reason why the iron should be wholly or predominantly ferric in the desired fibres is that we believe the formation of the magnesium-enriched surface layer is promoted by a mechanism which includes the oxidation of ferrous to ferric.

In particular, the surface layer is best formed by exposing fibres formed of a silicate network containing ferrous ions to oxidising conditions at a controlled temperature at which ferrous ions are oxidised in the fibres to ferric ions.

It is well known that the silicate network of mineral fibres such as rock, stone and slag wool fibres is a tetrahedral network formed predominantly by silicon, and optionally aluminium, bridged by oxygen atoms and also containing calcium, magnesium and iron atoms, and often small amounts of alkali metal and other atoms such as titanium. The calcium and magnesium atoms are thought to be held with in the network by relatively weak bonding to oxygen atoms of the network. This is stable under low and moderate temperatures.

However, if the temperatures increases (for instance to near or above Tg) when the surface of the fibres is exposed to oxidising conditions, we believe the calcium-oxygen and magnesium-oxygen bonds tend to break with consequential oxidation of ferrous to ferric and with the release of calcium and magnesium cations to diffuse through the solid network of the fibre towards the surface, which is under oxidising conditions. This release and diffusion does not seem to occur when the surface is not exposed to oxidising conditions.

The magnesium (and usually also the calcium) cations appear to be oxidised at the surface initially to form oxides, and it appears that they can then interact with the silica to form crystals such as diopside and/or angite, especially when the temperature is sufficiently high, and is usually above Tg.

In order to prevent the entire tetrahedral network crystallising, with subsequent severe effects on fibre properties such as brittleness, the temperature must not be too high and is usually below Tc.

Accordingly, formation of the desired surface layer seems to depend on both the equilibrium between external oxidising conditions and the calcium and magnesium cations which diffuse to the surface, and on the equilibrium between ferrous and ferric which exists at high temperatures (e.g., around or slightly above Tg, for instance 800° C.) when the calcium-oxygen and magnesium-oxygen bonds break.

Other atoms in the network have a lower tendency to break their oxygen linkages to the network. Thus although some alkali metal may sometimes leave its oxygen bonds behind and migrate to the surface, the amount is usually low. Aluminium and titanium diffuse much less and oxygen diffuses hardly at all, below Tg.

In order to optimise the mechanism, the fibres should initially contain sufficient ferrous ion to enter into the equilibrium and so in practice should have at least 2% by weight ferrous, and usually at least 3 or 4% by weight ferrous.

We are unaware of anyone having proposed previously, in the context of mineral fibres, any of the mechanisms and effects which are achieved in the invention. However we are now aware of a publication by Burkhard in Journal of Petrology, 2001, volume 42, pages 507 to 527 and we believe that this confirms our understanding of the chemical mechanism involved in the invention.

Burkhard is not concerned with fibres but is concerned with the crystallisation and oxidation of volcanic glass and reports experiments conducted on glass chunks and powder. These experiments show, for instance, the formation of a surface layer which is 15 to 20 μm thick and which has enhanced concentrations of calcium and magnesium and which is described as being formed of crystallised pyroxene. Depthwise crystallisation of this type would extend through the entire mineral fibres and so would make the fibres very brittle. Also, conventional crystallisation throughout the fibres does not have the effect of reducing surface melt flow as in the invention.

Burkhard suggests that the oxidation mechanism is related to cationic diffusion and that the diffusion of calcium and magnesium ions from the interior is charge balanced by the oxidation of ferrous to ferric. Since ferrous is the only element in conventional mineral fibres capable of being oxidised with in the fibre, this mechanism suggests that the presence of ferrous in the initial fibre is essential, and there are good experimental indications of a close relationship between the total amount of oxidation of ferrous to ferric (with consequential diffusion of magnesium and usually also calcium) and the collapse or sintering properties of the resultant fibre product.

The heating which is necessary to achieve the oxidation of ferrous to ferric in the fibres may tend to cause some embrittlement of the fibres because of the possibility of the initiation of a tendency to crystallisation with in the silicate network. The surface layer is therefore preferably formed at a temperature which minimises crystallisation throughout the thickness of the fibre. Thus the process should be conducted at a temperature below Tc.

The method of the invention by which mineral fibres are treated to form the fibres used in the invention requires exposing fibres containing ferrous iron to a controlled increased temperature which is above the temperature at which oxidation of the iron in the fibres occurs and which is preferably below the temperature at which network crystallisation occurs, i.e., it is below Tc.

It is essential that the increased temperature should be controlled and that the fibres are in an oxidising environment at substantially all times during the oxidation treatment. If the increase in temperature is random (for instance exposure to a high temperature flame) the required maintenance of oxidising conditions throughout the treatment cannot be guaranteed. Also the increased temperature must be maintained under oxidising conditions for a sufficient period of time to allow the required migration to occur. For instance, increasing the temperature too rapidly, and in particular if the temperature is increased as a result of a spontaneous exotherm and possible reducing conditions, may give little or no formation of the required surface layer on the surface.

With normal rock, slag or stone wool fibres, the oxidation of ferrous to ferric may start in the range 500 to 550° C. but it usually starts to a significant extent only at higher temperatures, for instance 550 to 600° C. or, often, 600 to 650° C. or sometimes even a little higher, for instance in the range 650 to 700 or 720° C. The occurrence of oxidation of ferrous to ferric can be monitored quantitatively by monitoring the increase in weight of the fibres. The oxidation treatment is normally conducted for at least 2 minutes, usually more than 10 minutes, e.g., 30 to 100 minutes.

Throughout the range at which oxidation is occurring, it is often desirable that the temperature should be increased in a controlled manner rather than in a random or sudden manner. It may be satisfactory to introduce a batt of fibres into an oven at the desired temperature but often it is desirable for the oven temperature to be increased in a controlled manner over a range starting at a temperature which may be as low as 100° C. or 50° C. below Tg, and is preferably at least 20° C. below Tg and which extends up to a temperature of, for instance, at least 30° C. and preferably at least 50° C. and often up to 100° C. above Tg, although preferably the maximum temperature is always below Tc. If a constant temperature is used it is preferably not too high, for instance it is preferably below Tg+100° C., and often below Tg+50° C.

The controlled increase is preferably performed so that the temperature of the fibres increases by a rate of not more than 30° C. per minute and preferably less than 20° C. per minute, most preferably 2 to 10° C. per minute, e.g., 5° C. per minute.

The use of a controlled temperature increase maximises the temperature range over which oxidation and outer layer formation can occur before network crystallisation (and embrittlement of the fibres) becomes undesirably significant, and it maximises the extent to which ferrous is oxidised to ferric.

The preferred way of making novel fibres according to the invention is by collecting the fibres as a non-woven web, and optionally forming this into a batt by cross lapping and compression, or by other conventional techniques, and then exposing the fibres to the desired controlled increase in temperature to cause the required oxidation and surface layer formation. This may be achieved by, for instance, passing the fibres, eg as a batt or web, through an oven whose temperature profile is controlled so as to give the batt or web the required increase in temperature as it passes through the oven. If the web or batt includes binder or other material which is exothermically combustible, it is preferably burnt off at a relatively low temperature.

The atmosphere in the oven, must be sufficiently oxidising to ensure oxidising conditions always exist in and around the batt or web, to allow the oxidation of ferrous to ferric to occur. The atmosphere can be air or it can be a mixture of oxygen with non-oxidising gas provided that the amount of oxygen is sufficient to maintain oxidising conditions. In practice the oven is usually a forced draft oven.

The amount of oxygen for this purpose can be relatively low and a partial pressure of oxygen of $10^{-2}$ (0.01) atmospheres seems to be sufficient, for instance in argon, whereas heating at an oxygen partial pressure of $10^{-5}$ atmospheres is usually in effective. It therefore seems that the oxygen partial pressure should preferably be at least 0.001 and preferably at least 0.005 atmospheres and generally 0.01 atmospheres or above.

If the desired product has the fibres in unbonded form or as bonded tufts, the process may be conducted on an unbonded batt or primary web instead of on a bonded batt and the treated web or batt may then be converted into the desired product.

The fibres may have been made by any suitable fiberising technique and typically are made by centrifugal fiberisation, for instance using a spinning cup or a cascade spinner process in conventional manner. The fibres may have conventional dimensions for fibres made by centrifugal fiberisation, for instance having a cumulative length based median diameter of less than 15 µm and preferably less than 10 µm, for instance 2 or 3 µm to 7 µm. The ratio of the average length to the average diameter is typically above 500:1 and often around 1000:1 to 2000:1.

The fibres are usually entrained in a stream of air close to the fiberising apparatus, in order to carry them away from that apparatus. Usually the air flows or other conditions to which the fibres are exposed between initial fiberisation and collection as a web are all relatively low temperature conditions as is conventional.

The fibres are usually collected as a web in the presence of a bonding agent to facilitate handling of the collected product and/or to suppress dust and/or as a lubricant. It is desirable to burn off all organic material (e.g., oil and binder) and any other exothermically combustible materials, before the fibres are subjected to the controlled or other desired increase in temperature which is preferably utilised for forming the desired surface layer. Thus, for instance, the binder may be burnt off at, for instance, at a temperature below 500° C. or 550° C. under conditions such that the temperature of the fibres does not exceed, for instance, 600° C. or 650° C. until the temperature can be controlled accurately by adjusting external heating.

Although the fibres having the surface layer may be present in the novel fibre products in combination with random or deliberate amounts of other fibres, it is preferred that the fibres should be distributed substantially uniformly throughout the mineral fibre product, and that preferably the fibres of the mineral fibre product consist substantially only of the treated fibres.

The novel mineral fibre products of the invention may take various forms. They can be loose fibres, for instance for injection as insulation, or they can be bonded tufts of fibres, but preferred products comprise a batt, i.e., a non-woven product of the fibres and which includes a binder or other system for improving the integrity of the batt.

The preferred novel batts preferably have the defined fibres distributed substantially uniformly throughout the batt. By this means substantially uniform sintering properties throughout the batt are achieved.

Various systems can be used for improving the integrity of the batt. If the system is an exothermically combustible binder, this can incur the disadvantage that exposing the batt to a combustion temperature may cause an exotherm which is greater than is desirable having regard to the properties of the fibres. It is therefore preferred that batts according to the invention should include a non-combustible system for improving the structural integrity of the batt. Such non-combustible systems include conventional techniques such as needling the batt or sewing the batt with inorganic or other non-combustible fibre, or the non-combustible system may comprise an inorganic bonding agent such as an aluminosilicate or other hydraulic cement. Another system includes loose fibres, or a batt of fibres, sandwiched between mesh or other sheet materials that will confine their movement.

Particularly valuable products of the invention are fire doors and sandwich panels which have been made by forming a treated batt as described above and then partially or wholly enclosing the batt with in sheets of sheet material of conventional type for such products, for instance foil or structural sheets (eg of wool, metal, plasterwood or plastics material) which are conventional for fire doors and sandwich panels. These sheets prevent free access of air and thus would be expected to encourage the reducing conditions which have previously been associated with unexpected sintering and collapse, but in the invention this is avoided as a result of the preformed surface layer on the fibres.

Other valuable products of the invention are loose fibres which may have been treated in accordance with the invention as a loose web or as loose fibres, or may have been formed by disintegration of a treated batt. The loose fibres maybe converted into a shaped batt in known ways and bonded by an organic or inorganic bonding agent.

The modified fibres (as batts, webs or loose fibres) may be subjected to conventional treatments, for instance they may be provided with surface coatings such as silicone oil or other hydrophobic or dust-reducing coatings. Conventional endothermic materials and other additives may be incorporated in the fire doors or sandwich panels in conventional manner.

The webs or batts may be of low density, for instance 10 to 50 kg/m$^3$ or may be of higher density (for instance 50 to 300 kg/m$^3$).

The following is an example.

Example 1

A mineral charge is melted in a cupola furnace to form a mineral melt which is then fiberised by a centrifugal cascade spinner to form fibres which are collected as a primary web. This is then cross lapped in conventional manner and consolidated to make a batt containing 0.5% oil and organic binder. The binder serves primarily as a lubricant and dust suppressant in this process.

The analysis of the fibres (by weight of oxides) is $SiO_2$ 43.5%, $Al_2O_3$ 19.0%, $TiO_2$ 1.1%, FeO 6.0%, CaO 20.3%, MgO 6.6%, $Na_2O$ 2.4%, $K_2O$ 0.3%, $P_2O_5$ 0.2% and MnO 0.5%.

The batt contains 31.6% shot particles having a diameter above 63 µm and it has a median fibre diameter of 4.2 µm, with 16% below 2 µm and 84% below 7.2 µm. The batt is needled in conventional manner. The binder and oil are burnt off in an oven.

The resultant conventional batt is labelled batt X.

In one test, batt X is then passed through a gas blown oven in which the temperature to which the fibres in the batt are subjected is controlled at a value of between 600 and 800° C. for between 2 and 90 minutes. For this particular fibre, Tg is 680° C. and Tc is 870° C., both determined by DSC.

The atmosphere in the oven is air and the temperature to which the batt is subjected in the oven is raised from 620° C. to about 800° C. at a rate of 10° C. per minute.

SNMS (Secondary Neutral Mass Spectroscopy) analysis shows that the final product has an analysis for all elements which is substantially uniform up to the outer 0.5 µm layer. Between 0.5 and 0.1 µm there is a gradual increase in the concentrations of magnesium and calcium and a decrease in the concentration of most other elements, and in the outermost 0.1 µm the concentration of calcium and magnesium is significantly increased with a corresponding reduction in the concentration of the other elements.

Monitoring the colour and the weight of the batt as the temperature increases shows that the colour remains unchanged and the weight decreases as the temperature rises to around 550° C. (indicating combustion or volatilisation or organics). From around 600° C. there is a gradual increase in weight until, at around 870° C., the increase in weight is around 0.6%. Complete oxidation of 6% ferrous to 6% ferric ion would correspond to a weight increase of 0.67%.

When the treated batt is exposed to a temperature of 1050° C. under conditions simulating those in a fire door (i.e., a closed environment) it is brittle but does not significantly collapse and so has maintained its effective fire protection properties. However when the untreated batt is subjected to the same conditions, it shrinks significantly.

In another set of tests starting with untreated product which is the same as batt X, two samples are taken.

One is reference sample X that is not treated further. The other sample Y is pre-oxidised in an electric heated oven at 700° C. for 30 minutes.

Both the references sample X and the pre-oxidised sample Y are exposed to a temperature of 1100° C. under conditions simulating those in a fire door (ie., a closed environment) according to ISO 834/DIN 4102 teil 8.

After 90 minutes of testing the pre-oxidised sample Y is brittle but does not significantly shrink and complies with EN 13501/2. The (average) temperature on the unexposed surface of the pre-oxidised sample Y after 90 minutes of testing is 311° C. However when the reference sample X is subjected to the same conditions it shrinks and sinters significantly. The temperature on the unexposed surface of the untreated sample is 398° C. after 90 minutes of testing.

Example 2

In order to examine the mechanism more precisely, samples of fibres, made by the same cupola-cascade spinner technique as in example 1, were made having the following analysis, by weight of oxides, namely $SiO_2$ 45.8%, $Al_2O_3$ 14.9%, $TiO_2$ 1.6%, FeO 7.6%, CaO 14.3%, MgO 10.9%, $Na_2O$ 2.0%, $K_2O$ 1.0% and $P_2O_5$ 0.4%. The starting material was labelled ST1.

The material was then subjected to 90 minutes in an oxidising furnace at a temperature of 600° C. (sample ST2), 680° C. (sample ST3) or 760° C. (sample ST4).

The SNMS depth profiles each of samples ST1 to ST4 were determined for the outer 0.7 μm of each sample in respect of Mg, Ca, Fe, Na, Al, Si and K by conventional techniques. The results are shown in the graphs which are FIGS. 1 to 7 in the accompanying drawings.

These graphs clearly show that the amount of Mg in the outermost 0.1 μm is significantly increased (relative to the normal concentration, ie. the overall analysis of the fibre) in each of ST2, ST3 and ST4 relative to the starting fibre ST1. They also show that the amount of calcium in the outermost 0.1 μm is considerably increased for ST2 and ST3, but there is a lesser increase in this experiment for ST4, at the higher temperature of 760° C. Conversely, the amount of iron is considerably increased for ST4 (at 760° C.) and is also slightly increased in the starting fibre ST1, but is substantially the same at the surface as in the core for the fibres treated at 600 and 680° C.

The graphs also show that the amount of sodium is increased at the extreme surface in the untreated fibre and is also increased in the ST2 fibre treated at 600° C., but is depleted in the ST3 and ST4 fibres.

Example 3

Fibres were formed by a cupola-cascade spinner technique broadly as described in Example 1 having a composition $SiO_2$ 40.6%, $Al_2O_3$ 20.8%, $TiO_2$ 1.6%, FeO 7.1%, CaO 13.6%, MgO 11.4%, $K_2O$ 0.8%, $Na_2O$ 1.6% and $P_2O_5$ 0.3%. The fibres were collected free of binder, oil and other additives and were sieved to remove shot. The median fibre diameter was 4.9 μm with 16% below 2 μm and 84% below 8.4 μm. This fibrous product was split into samples A to E. Each sample was subjected to different conditions, stated below, and a scanning electron micrograph was recorded of each resultant product. These SEMs for resultant samples A to E are FIGS. 8A to 8E respectively in the accompanying drawings.

Sample A was exposed to 1050° C. in the presence of air. This therefore does not reproduce normal conditions for a fire protection product since the burn off of binder and restricted air supply will create more reducing conditions in normal practice.

Sample B was exposed to such conditions, as a result of heating at 1050° C. in an argon atmosphere.

Sample C was exposed to heating under oxidising conditions for 2 minutes at 691° C. (the Tg for the fibres) and was then exposed to 1050° C. in argon. The SNMS peak Mg and Ca concentration were 1.7 and 1.3 times, respectively, the normal concentrations.

Sample D was treated the same as Sample C except that it was exposed to oxidising conditions at 643° C. for 30 minutes.

Sample E was subjected to the same conditions as Sample C except that it was exposed to 691° C. for 30 minutes. The SNMS peak Mg and Ca concentrations were 2.7 and 1.5 times, respectively, the normal concentrations.

The sintering problem created by exposure of conventional fibres to high temperature under reducing conditions is clearly shown by comparison of photographs A and B. The benefit of applying adequate preoxidation, in accordance with the invention, is shown by comparing samples and micrographs 8B with 8C, 8B with 8D and, for best results, 8B with 8E.

A similar experiment was conducted on Sample A at 691° C. for 4 hours and 20 hours and SNMS analysis of this for peak concentrations of Mg and Ca respectively showed 3 and 1.6 times the normal concentration.

A similar experiment was conducted on Sample A at 691° C. for 20 hours and SNMS analysis of this for peak concentration of Mg and Ca respectively showed 3.3 and 1.3 times the normal concentration.

The invention claimed is:

1. A mineral fibre product comprising fibres formed of a silicate network and comprising silicon, calcium, magnesium, iron, aluminium, oxygen and optionally alkali metal characterised in that the fibres have an analysis (expressed as % by weight oxides) including at least 3% FeO, 0 to 8% alkali metal oxide and at least 5% MgO, in that at least 70% of the iron is ferric in that the fibres have a core surrounded by an outer surface layer less than 1 μm thick in which the peak concentration of magnesium atoms is at least 1.5 times the concentration of magnesium atoms in the total fibre.

2. A product according to claim 1 in which the surface layer has a peak concentration of calcium atoms greater than the concentration of calcium atoms in the total fibre.

3. A product according to claim 2 in which the surface layer has a peak concentration of calcium atoms at least 1.5 times the concentration of calcium atoms in the total fibre.

4. A product according to claim 1 in which the surface layer has a peak concentration of iron atoms at least 1.2 times the concentration of iron atoms in the total fibre.

5. A product according to claim 1 in which the surface layer merges with the core and has been formed by outwards diffusion of magnesium ions to the surface of the fibres.

6. A product according to claim 1 in which the peak concentration of magnesium is at least 2 times the concentration of magnesium in the total fibre.

7. A product according to claim 1 in which at least 95% of the iron is ferric.

8. A product according to claim 1 in which the fibres have an analysis (expressed as % by weight oxides) including at least 3% FeO, 0 to 8% alkali metal oxide, 33 to 55% $SiO_2$, at least 8% CaO, at least 5% MgO and up to 25% $Al_2O_3$.

9. A product according to claim 1 in which the fibres are fibres which have been formed by centrifugal fiberisation of a melt in which the iron is mainly ferrous.

10. A product according to claim 1 comprising a batt or web wherein the fibres having the surface layer are distributed substantially uniformly throughout the bait or web.

11. A product according to claim 1 comprising a batt comprising the fibres having the surface layer and a non-combustible system for improving the structural integrity of the bait, wherein the system is selected from needling of the batt, an inorganic bonding agent, and sewing of the batt by inorganic threads.

12. A product according to claim 1 in the form of a fire door or sandwich panel comprising a batt comprising the fibres having the surface layer partly or wholly enclosed within sheet materials.

13. A method of treating mineral fibres formed of a silicate network to improve their high temperature properties wherein the fibres comprise silicon, calcium, magnesium, iron, aluminium, oxygen and optionally alkali metal, characterised in that the fibres have an analysis (expressed by weight oxides) including iron in an amount of at least 3% measured as FeO and in which there is at least 2% iron (measured as FeO) present as ferrous iron, 0 to 8% alkali metal oxide and at least 5% MgO, and the method comprises exposing the fibres containing at least 2% by weight ferrous iron under oxidising conditions to a controlled increased temperature which is above the temperature at which oxidation of the iron in the fibres occurs but which is below the temperature at which substantial network crystallisation occurs and thereby oxidising the ferrous iron to provide fibres in which at least 70% of the total iron is ferric.

14. A method according to claim 13 in which the fibres are exposed under oxidising conditions to a temperature which is at least the glass transition temperature less 50° C. but below the crystallization temperature.

15. A method according to claim 14 in which the controlled increased temperature is increased during the process.

16. A method according to claim 15 in which the rate of increase of the temperature to which the fibres are subjected at temperatures above the glass transition temperature less 20° C. is less than 20° C. per minute.

17. A method according to claim 13 in which the fibres are initially formed by centrifugal fiberisation of a melt formed in a cupola furnace.

18. A method according to claim 13 in which the fibres are formed and collected as a batt or web and the batt or web is then exposed to the controlled increased temperature in a heated, forced draft, oven.

19. A method according to claim 13 in which the fibres are exposed under oxidising conditions to a temperature which is at least the glass transition temperature but below the glass transition temperature plus 100° C.

20. A product according to claim 8 in which the surface layer has a peak concentration of calcium atoms at least 1.5 times the concentration of calcium atoms in the total fibre and a peak concentration of iron atoms at least 1.2 times the concentration of iron atoms in the total fibre and a peak concentration of magnesium is at least 4 times the concentration of magnesium in the total fibre, in which at least 95% of the iron is ferric, and in which the surface layer merges with the core.

* * * * *